United States Patent
Battistutto et al.

(10) Patent No.: US 6,708,084 B2
(45) Date of Patent: Mar. 16, 2004

(54) CENTRALIZED SYSTEM FOR THE REMOTE CONTROL OF IRRIGATION PLANTS

(75) Inventors: Roberto Battistutto, Udine (IT); Roberto D'Amato, Pordenone (IT); Alessandro Citron, Sacile (IT)

(73) Assignee: Claber S.p.A., Fiume Veneto (IT)

( * ) Notice: Subject to any disclaimer, the term of this patent is extended or adjusted under 35 U.S.C. 154(b) by 0 days.

(21) Appl. No.: 10/323,734

(22) Filed: Dec. 20, 2002

(65) Prior Publication Data

US 2003/0120357 A1 Jun. 26, 2003

(30) Foreign Application Priority Data

Dec. 21, 2001 (IT) .................................... MI2001A2790

(51) Int. Cl.[7] .............................................. G05D 11/00
(52) U.S. Cl. ......................................... 700/284; 239/69
(58) Field of Search ................................. 700/283, 284, 700/285; 239/69, 70; 137/624.11–624.15

(56) References Cited

U.S. PATENT DOCUMENTS 5,740,031 A * 4/1998 Gagnon ........................ 700/16
6,259,955 B1 * 7/2001 Brundisini et al. ........... 700/15
6,259,970 B1 * 7/2001 Brundisini ................... 700/284
6,314,340 B1 * 11/2001 Mecham et al. ............. 700/284
6,600,971 B1 * 7/2003 Smith et al. ................. 700/284
2003/0120393 A1 * 6/2003 Bailey et al. ................ 700/284

FOREIGN PATENT DOCUMENTS

EP          0805381 A2     11/1997
EP          0901749 A2      3/1999

* cited by examiner

*Primary Examiner*—Leo Picard
*Assistant Examiner*—Zoila Cabrera
(74) *Attorney, Agent, or Firm*—Jacobson Holman PLLC

(57) ABSTRACT

The present invention refers to a centralized control system that provides a plurality of transmittable commands to at least one connection interface. Said transmittable commands comprise a first command containing instructions for loading the contents of a third memory (NVM) in a first memory, a second command containing instructions for reading the contents of said first memory and transmitting it to said personal computer, a third command containing instructions for writing directly in said first memory, a fourth command containing instructions for reading directly the data contained in said first memory, a fifth command containing instructions for reading the data contained in a second memory; a sixth command containing instructions for selecting between a first (local) and second (remote) operative mode.

7 Claims, 6 Drawing Sheets

CENTRALIZED SYSTEM FOR THE REMOTE CONTROL OF IRRIGATION PLANTS

DESCRIPTION

The present invention refers to a centralised system for the remote control of irrigation plants.

Centralised structures for the remote control of irrigation plants commanded by electronic control units are known, which by means of communication interfaces enable programming parameters of the electronic control units to be modified in remote mode.

The main manufacturers of irrigation plants produce both the hardware component and the software component to carry out this remote control of the irrigation plants.

There is a widespread need to use a personal computer as main work station by means of which all the various functions of a modern automatic irrigation plant can be controlled.

These personal computers, also placed in a network configuration, mainly use common operative systems and the respective computer instruments made available to the developers such as, the programming languages MS Visual C++, MS Visual Basic and MS SQL and the respective development instruments, such as MS Visual C++, MS Visual Basic, MS MSDN, HASP Edit for Win 32 and MS Access.

Nevertheless the software component that each manufacturer of irrigation plants places on the market is neither flexible, nor intuitive in its use as the management software associated to the hardware component does not have practical and prompt management characteristics.

In fact a modern automatic irrigation plant includes a plurality of communication interfaces each of which is connected to an electronic control unit of the plant itself.

The software and hardware management that the manufacturers offer is directed to at expert people in the art and therefore result to be of very little use by the average user.

A type of interface is known by the European patent application EP 901749 in the name of the same Applicant, in which a communication interface is illustrated associable to an electronic control unit of an automatic irrigation plant which is capable of interfacing to a generic electronic control unit so as to permit the remote control of the irrigation plant.

A type of control unit for an irrigation plant is in turn described in the European patent EP 805 381 in the name of the Applicant, in which a unit provides two distinct programming methods, by means of which it is possible to separate the most frequent use functions, relating for example to setting the base data for the operating of the control unit, from the most advanced functions, relating for example to the most sophisticated and personalised controls, as illustrated successively in FIG. 3.

In view of the state of the art, the object of the present invention is to provide a centralised control system capable of managing, programming and controlling an automatic irrigation plant in the simplest and most intuitive manner possible by a user.

According to the present invention, such object is reached thanks to a centralised control system comprising a personal computer; at least one communication interface having a first memory suitable for memorising a plurality of commands and a second memory suitable for memorising the events; at least one electronic control unit having a microprocessor and a third memory suitable for memorising the firmware necessary for the operating of said microprocessor; said control unit being suitable for controlling a plurality of solenoid valves and a main valve; said personal computer being connected to said at least one electronic control unit by means of said at least one control interface through communication means; said personal computer being provided with a management program resident in said personal computer; characterised in that said management program provides a plurality of commands that can be transmitted to said at least one connection interface, said transmittable commands comprising a first command containing instructions for loading in said first memory the contents of said third memory, a second command containing instructions for reading the contents of said first memory and sending them to said personal computer, a third command containing instructions for selecting specific portions of said first memory in which to write the data, a fourth command containing instructions for reading the data contained in said first memory, a fifth command containing instructions for reading the data contained in said second memory; a sixth command containing instructions for selecting between a first and second operative mode.

Thanks to the present invention simple and intuitive centralised control of an automatic irrigation plant can be achieved.

The characteristics and advantages of the present invention will be made evident by the following detailed description of an embodiment thereof, illustrated as a non-limiting example in the enclosed drawing, wherein.

Figure 1:
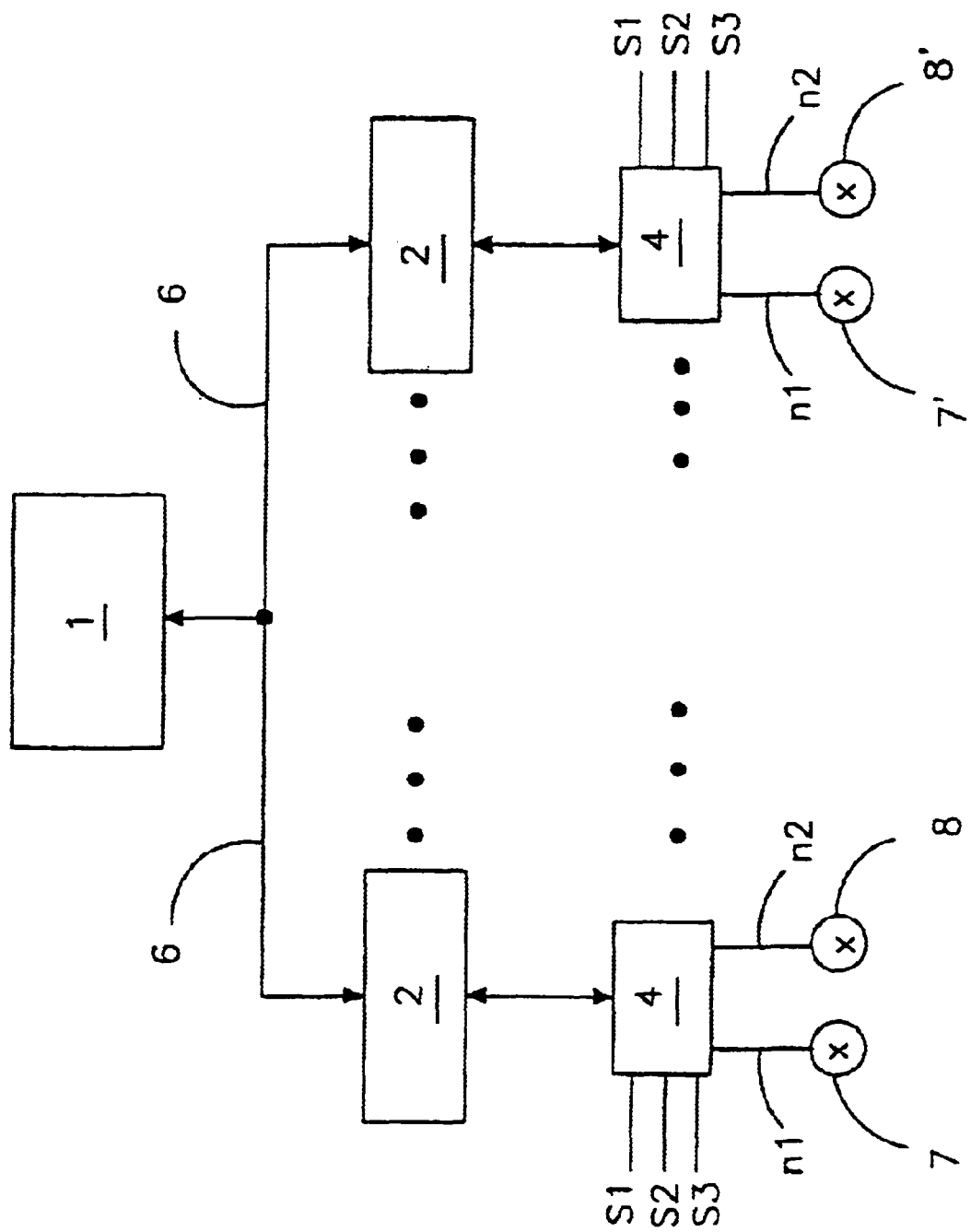
FIG. 1 shows a basic scheme of a centralised control system in accordance with the present invention.

The basic scheme of a centralised control system in accordance with the present invention is shown in FIG. 1, in which a first block 1 connected to a first plurality of blocks 2 in turn connected to a second plurality of blocks 4 can be noted.

Block 1 represents a personal computer inside which the centralised control method in accordance with the present invention is installed and operates.

Figure 2:
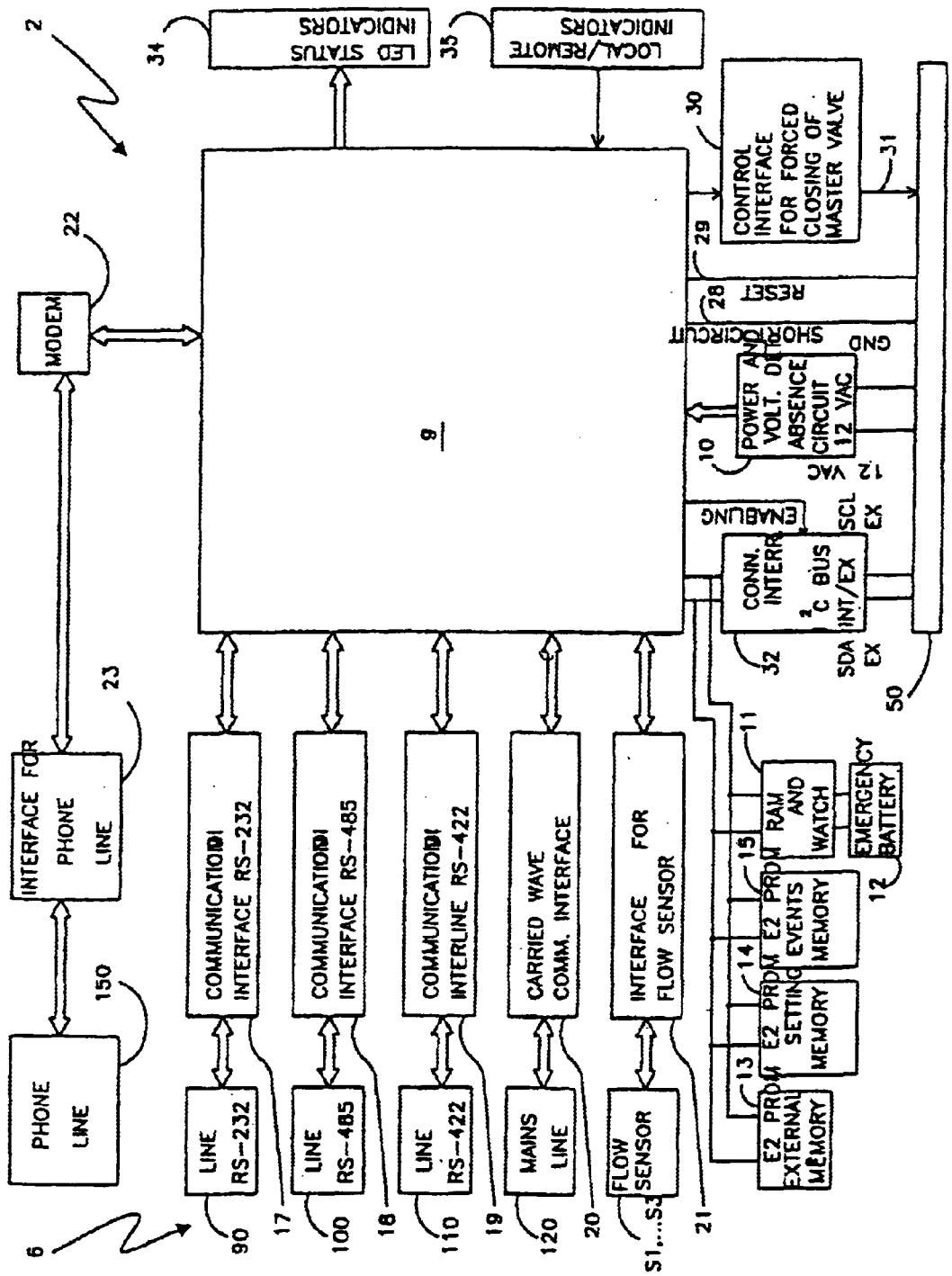
FIG. 2 shows an operational block diagram of an interface comprised in the control system of FIG. 1.

The first plurality of blocks 2 represents a connection interface equipped with microprocessor, illustrated successively in FIG. 2.

Said connection interfaces 2 are connected to said personal computer by means of a communication line 6, for example of the communication serial line of RS232 type, by means of a modem and relative standard telephone line, or by means of a GSM telephone line, or by means of a radiofrequency connection, as shown successively.

Figure 3:
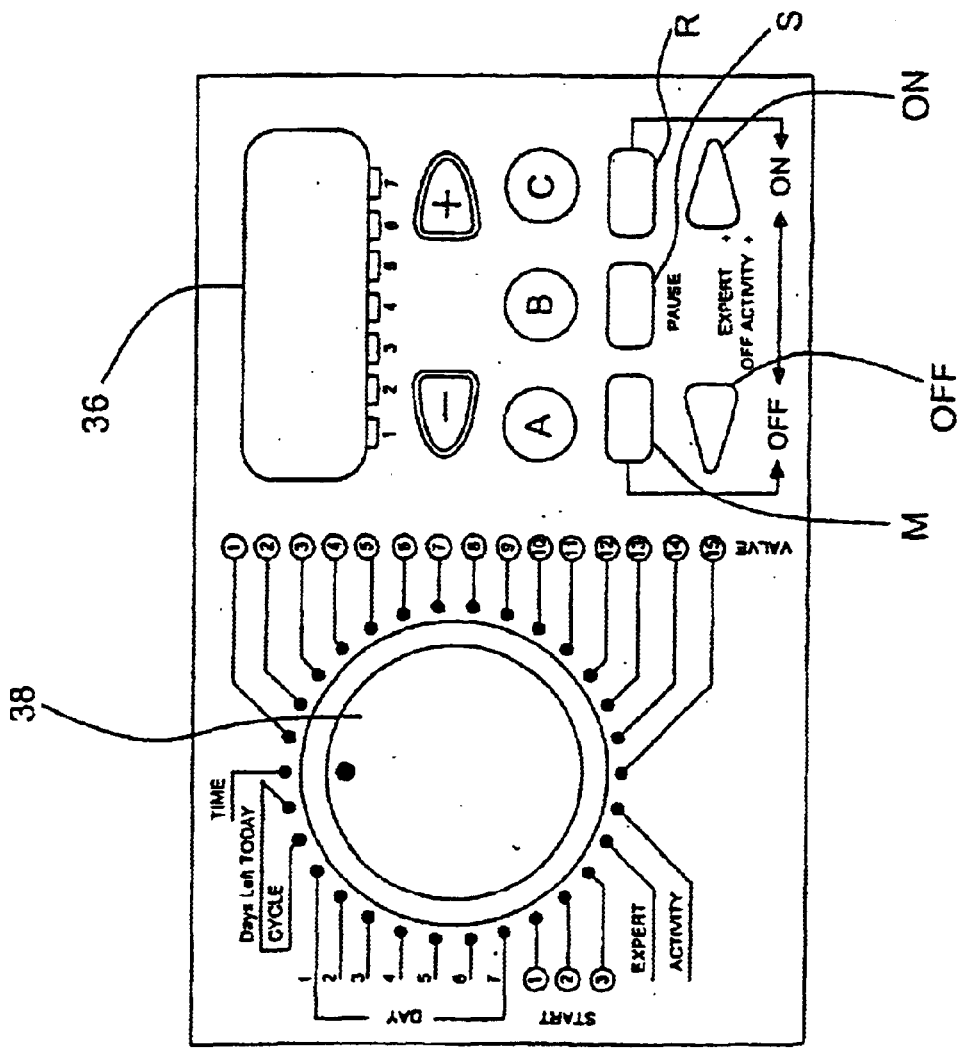
FIG. 3 shows a perspective view of a unit comprised in the control system of FIG. 1.

The second plurality of blocks 4 represents an electronic control unit, illustrated successively in FIG. 3.

Each electronic control unit 4 controls a main valve 7, . . . , 7', also called master valve, and a plurality of solenoid valves 8, . . . , 8'. The number of the controlled solenoid valves 8, . . . , 8' can vary in function of the program set in each electronic control unit 4 as explained successively.

FIG. 2 shows an operational block diagram of a connection interface 2 of the architecture of FIG. 1.

The connection interface 2 comprises a microprocessor processing unit 9. Microprocessor 9 is associated to: a power supply 10 that receives from a connector 50 connecting with a respective programmable electronic control unit 4, shown in FIG. 3, said power supply 10 including preferably a circuit for detecting the absence of supply voltage; a memory RAM 11 also incorporating a clock function, the memory RAM 11 being associated to an emergency battery 12; a first non-volatile memory 13, preferably an EEPROM; a second non-volatile memory 14, preferably an EEPROM, for containing operating parameters of interface 2; a third non-volatile memory 15, it also preferably an EEPROM, for the memorisation of the events detected by the interface concerning the behaviour of the control unit and the irrigation plant controlled. The memory RAM 11 and the non-volatile memories 13, 14 and 15 are connected to the microprocessor 9 through a serial bus communication 51 inside the interface, for example an "IIC" bus.

The microprocessor 9 is also connected to: a first communication interface 17 for interfacing the microprocessor 9 to a communication line 90 complying with the standard RS-232; a second communication interface 18 for interfacing the microprocessor 9 to a communication line 100 complying with the standard RS-485; a third communication interface 19 for interfacing the microprocessor 9 to a communication line 110 complying with the standard RS-422; a fourth carried wave communication interface 20 for interfacing the microprocessor 9 to an electric mains line 120 (for example, a line at 220V at 50 Hz) to use as communication line according to the carried wave technique (Power Line Carrier); an interface 21 for interfacing the microprocessor 9 to an external flow sensor 130. The microprocessor 9 is also connected to a modem 22, which is interfaced, by means of an interface for telephone line 23, to a standard telephone line or GSM 150.

The microprocessor 9 receives a short circuit signal 28, from the connector 50 connecting with one of the electronic control units 4, that the electronic control unit 4 activates when it detects a short-circuit condition on one or more of the irrigation lines that it controls. The microprocessor 9 supplies a reset signal 29 to the electronic control unit 4, by means of connector 50, which is activated by the microprocessor 9 when the electronic control unit 4 itself needs to be reset. The activation of the reset signal 29 can for example determine the cancellation of the programming parameters of the electronic control unit 4.

In addition the microprocessor 9 commands a control interface 30 for the forced closing of the master valve 7 of the 'irrigation plant managed by the respective electronic control unit 4; by means of connector 50, the interface 30 supplies a signal 31 to the respective control unit 4, which signal is activated when the forced closing of the master valve of the irrigation plant needs to be determined.

The internal serial communication bus 51 of the interface is also connected to an interfacing circuit 32 with a similar serial communication bus possibly present on the electronic control unit 4, to which the interface circuit 32 is connected, by means of connector 50, by means of two signals SDA_EX and SCL_EX. The interface circuit 32 is commanded by the microprocessor 9 by means of an enabling signal 33 that permits the enabling of the connection between bus 51 inside the interface and the bus provided for on the electronic control unit 4.

The microprocessor 9 also commands a group of interface status indicators 34, for example constituted of LEDs, and is connected to a configuration switch 35 for configuring the interface 2 according to an local or remote operating mode.

FIG. 3 shows a perspective view of the electronic control unit 4 of the architecture of FIG. 1.

The control unit 4 comprises a display 36, preferably of the liquid crystal type, a keyboard 37 and a rotary selector 38 that can assume a plurality of angular positions.

The keyboard 37 comprises ten keys, respectively indicated with "+", "−", A, B, C, M, S, R, OFF and ON, whose function is to set the irrigation programs named with A, B and C, respectively.

The control unit 4 is provided with connection means (not shown in FIG. 3) for connection to the respective connection interface 2.

Said control unit 4 comprises another microprocessor processing unit (not shown in FIG. 3) that comprises an internal non-volatile memory NVM of the ROM or EPROM or EEPROM type in which the firmware is memorised that determines the operations carried out by the microprocessor itself, and a dynamic internal memory DIM of the RAM type (not shown in FIG. 3) in which the data relating to the irrigation programs being carried out are memorised.

These irrigation programs named with A, B and C permit the direct control of a plurality of solenoid valves 8, . . . , 8', for example of six, nine, twelve or fifteen solenoid valves, plus an output for the master valve 7.

For each of the three programs A, B, and C it is possible to set the irrigation times for each solenoid valve 8, . . . , 8', the hour of three daily starts, the days of the week enabled for the execution of the specific program A or B or C, the possible cyclic repetition of the specific program A or B or C, the delay time between the closing of a solenoid valve 8, and the opening of the successive one, the water budget with a percentage correction, from 0% to 150%, of the irrigation times set, the activation or not of the output for the master valve 7, the activation or not of each of the three sensor inputs S1, S2, S3, the unit of measurement of irrigation times (hours:minutes or minutes: seconds).

In particular for the control of three sensor inputs S1, S2 and S3 it is possible to set the function Start, Stop, Skip and Pause, attributed on the three programs A, B and C, the delay time in confirmation of the sensor signal S1 or S2 or S3, the control of a pause for rain, setting the language of the messages on the display LCD (Italian, English, French, Spanish), signalling of possible short circuits, for each station, the control of station opening in manual, the execution of a program testing the stations and other specific settings.

The configuration of all the above mentioned functions is contained in the internal non-volatile memory NVM of the microprocessor.

The connection interface 2 stores a copy of the memory NVM of the connected control unit 4 in its own SETUP memory 14 and also stores copy of the memory NVM "unloaded" in remote by means of the telephone line 150 by means of the interface 23 using for example the modem 22.

In addition said connection interface 2 updates, that is rewrites, the memory NVM of the control unit 4 already present in its own memory of SETUP 14 in case this memory NVM results to be different from that "unloaded" in remote.

In addition said connection interface 2 enables or disenables the master valve 7 associated to it according to a weekly calendar (days of the week and hours of the day enabled) by means of the control interface 30.

In addition by means of one of the sensors S1, ..., S3, for example an pulse flowmeter, said connection interface 2 reads and records with the respective interface 21 the water consumption independently for each solenoid valve 8, ..., 8'.

By means of the above mentioned pulse flowmeter S1 or S2 or S3, the microcontroller 9 carries out measurements of water flow for each solenoid valve 8, ..., 8' and detects possible alarm situations, such as excessive flow or poor flow, in function of threshold levels programmed by the user by means of the management program, as successively illustrated.

The connection interface 2 can be programmed by means of the switch 35 commanded by the inventive management program, and thus locally control the master valve 7 in the above mentioned cases of excess flow alarm and/or leakages alarm.

In addition to the above mentioned control functions, the connection interface 2 detects and records locally in the events memory 15 a series of events and alarms, such as: turning on and off of each solenoid valve 8, ..., 8' and relative total consumption data and changes of date; lack of electricity supply by means of the voltage absence detection circuit 10; reset electricity supply, master valve 7 closed for excessive flow alarm, master valve 7 reopened to solenoid valve 8, ..., 8' successive after closing for excessive flow alarm, situation of water flow to solenoid valves off, more than three solenoid valves 8, ..., 8' open at the same time and short circuit on one or more solenoid valves 8, ..., 8'.

The events memory 15 of the interface 2 has a capacity that enables it to always record the last 2048 events/alarms.

The data communication between the plurality of connection interfaces 2 and the personal computer 1 can come about by means of suitable connection means 6, such as: a serial data line RS232 90 via direct cable and the relative communication interface 17, or by means of the serial data line RS485 100 via direct cable and the relative communication interface 18, or by means of the serial data line RS422 110 via direct cable and the relative communication interface 19, or by means of the network line 120 and the relative communication interface 20, or by means of the modem, or GSM, or radio 22 and relative telephone line interface 23.

The personal computer 1 in which the innovative management program is loaded can transmit to one and/or more connection interfaces 2 a series of commands in coded form.

Among these there are: a first command C1 containing a first plurality of instructions 11 that are used to load the operative program contained in the command itself (128 bytes) in the memory 14 of the interface 2, to write the operative program in the memory NVM of the electronic control unit 4, to reread the operative program of the memory NVM of said electronic control unit 4, to turn off all the solenoid valves 8, ..., 8' associated to an electronic control unit 4; a second command C2 containing a second plurality of instructions 12 that are used to read the programme from the memory NVM of the electronic control unit 4 and transmit it to the personal computer 1 by means of one of the connections 6 previously described; a third command C3 containing a third plurality of instructions 13 that are used to command the operation of direct writing in the memory setup 14 of the interface 2, and said third command C3 can define memory intervals as required and write the data contained in the command itself; a fourth command C4 containing a fourth plurality of instructions 14 that serve to command an operation of direct reading from said memory setup 14 of the interface 2, and said fourth command C4 can define memory intervals as required and read the data contained; a fifth command C5 containing a fifth plurality of instructions 15 that are used to command an operation of direct reading from the events memory 15 of the interface 2 and said fifth command C5 can define memory intervals as required and read the data contained; a sixth command C6 containing a sixth plurality of instructions 16 that are used to control the functionality in manual or automatic and said sixth command C6 is used with the function of emergency stop.

The connection interface 2 reacts to said commands C1, ..., C6 carrying out what is specified and, if requested, transmitting packets of data to the management program resident on said personal computer 1.

Said commands C1, ..., C6 are used by said management program so as to carry out writing and reading operations involving the relative memory areas of setup 14 and events 15 of the interface 2.

In other words the management program has the operative memory NVM of the electronic control unit 4 available which is copied in the memory of setup 14 of the interface 2, the remaining portion of the memory setup 14, the events memory 15, the plurality of commands C1, ..., C6 interpretable by the interface 2 and the connection means 6 with said connection interface 2.

On the basis of what has been described up to now the management program manages the control units 4 according to the process flows illustrated in the following FIGS. 4, 5 and 6.

Figure 4:
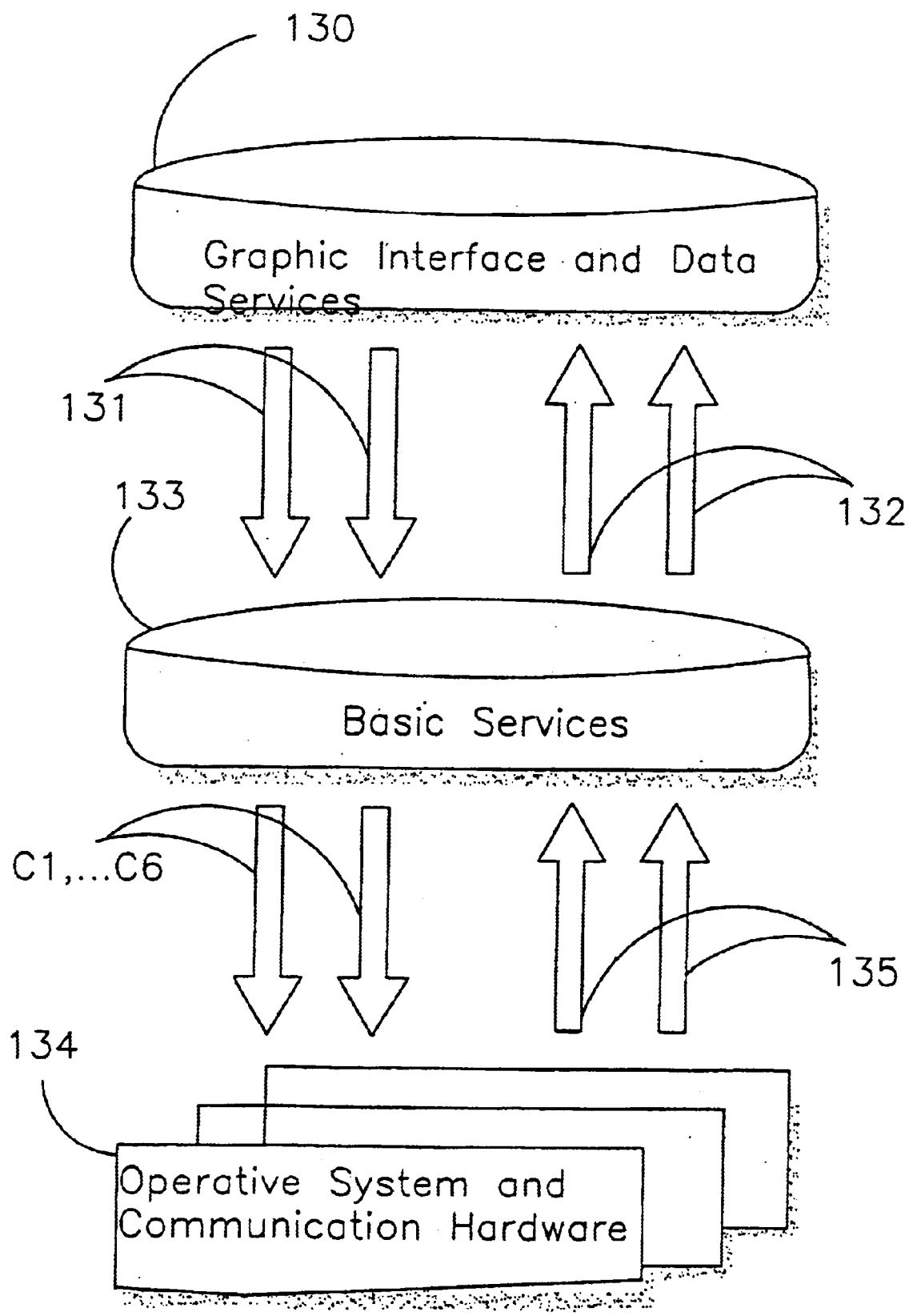
FIG. 4 shows an operating diagram of the management program comprised in the control system of FIG. 1 in accordance with the present invention.

Now in reference to FIG. 4, a block 130 can be seen, that represents the graphic interface and the data services of the management program, said block 130 suitable for transmitting a plurality of coded data 131 that are ready to be transformed in said plurality of commands C1, ..., C6 by means of calls to the system resources of the personal computer 1. Said block 130 also receives another plurality of coded data 132, generated by another block 133, said data 132 represent the data that can be interpreted by the graphic interface 130. Said coded data 132 can also be errors of the system and/or of the hardware components that are made known to the user.

The coded data 131 pass to the other block 133 that represents the basic services, for example, management of the operative system of the personal computer 1, or the command algorithms of the interfaces 2.

Said block 133 generates the plurality of commands C1, ..., C6 so that the hardware management of the communications interfaces 2 is possible in their complex, by means of Block 134. All those errors 135 that the interfaces 2 have recorded in their events memory 15 are generated from said block 134.

Figure 5:
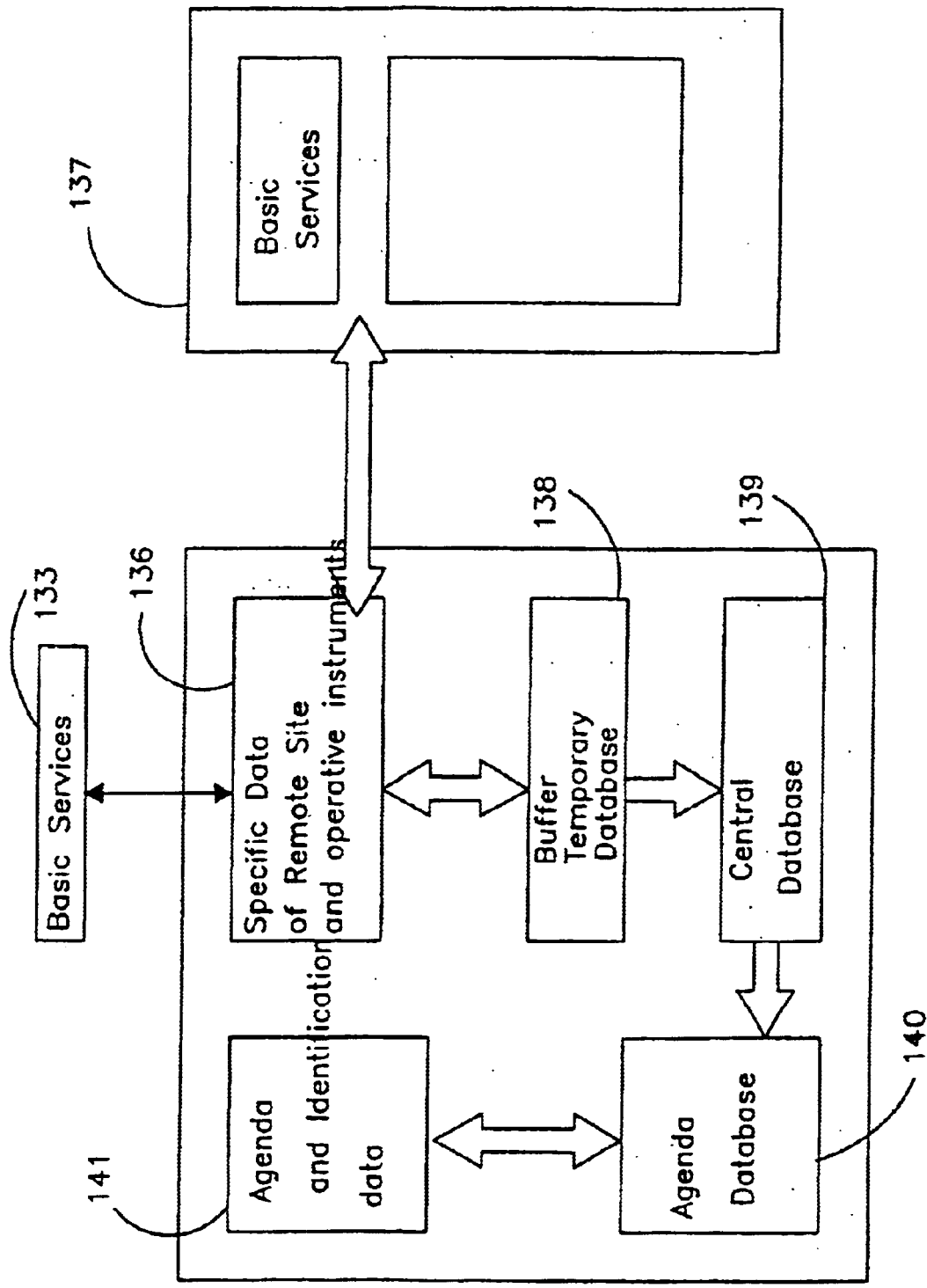
FIG. 5 shows a more detailed operating diagram of the management program of FIG. 4.

Now with reference to FIG. 5, in which the organisation of block 133 is shown schematically, it can be seen how said block of basic services 133 interacts directly with a further block 136 suitable for representing the specific data of the solenoid valve 8, ..., 8' and the operative instruments necessary for representing said data.

The basic services 137 of the management program are interfaced to the data of block 136, while the basic services block 136 provides a temporary database 138 to allow for the processing of the data that have not been saved.

The specific data contained in the block 136 permit, for example, the execution by means of the graphic interface 130, of a graphic simulator of the electronic control unit 4 or a table for the planning of the irrigation and for the analytic reading of the memory NVM of the electronic control unit 4, or graphs for the analysis of the partial consumptions from the last connection and total consumptions or a system for the combined analysis of the consumptions and of the activities expressed in the form of a table, or a graph for the analysis of the times of the activities with resolutions variable from eight days to one hour or an automated management of the thresholds and the delays for the excessive or inadequate flows alarms, or parameter management of the flow sensors S1, . . . , S3 or automated management of the rain gage parameters, or a journal of the alarms received and memorised in the events memory 14.

In particular the basic services of the block 137 concerning the inventive management program permit, for example, the generation of strings for the complex commands, to order the commands, to manage the errors of the interfaces 2, to manage the errors of the operative system 134, to manage the hardware components of the communication means 6, to manage the database 139, 140 and 141, to manage the low level graphs, to manage the user interface 130.

The data of the block 136 are retrieved by a central database 139 that contains the specific data of every site (solenoid valve) and recalls the data according to an index present in an agenda database 140 suitable for containing the index of the remote sites controlled by the management program with the respective identification data.

The agenda database 140 retrieves the data from an agenda database and identification data 141, in which there is data, for example: the telephone numbers, the IP address of the connection RS485, the presence of one or more sensors S1, . . . , S3 and the type of control unit 4.

Figure 6:
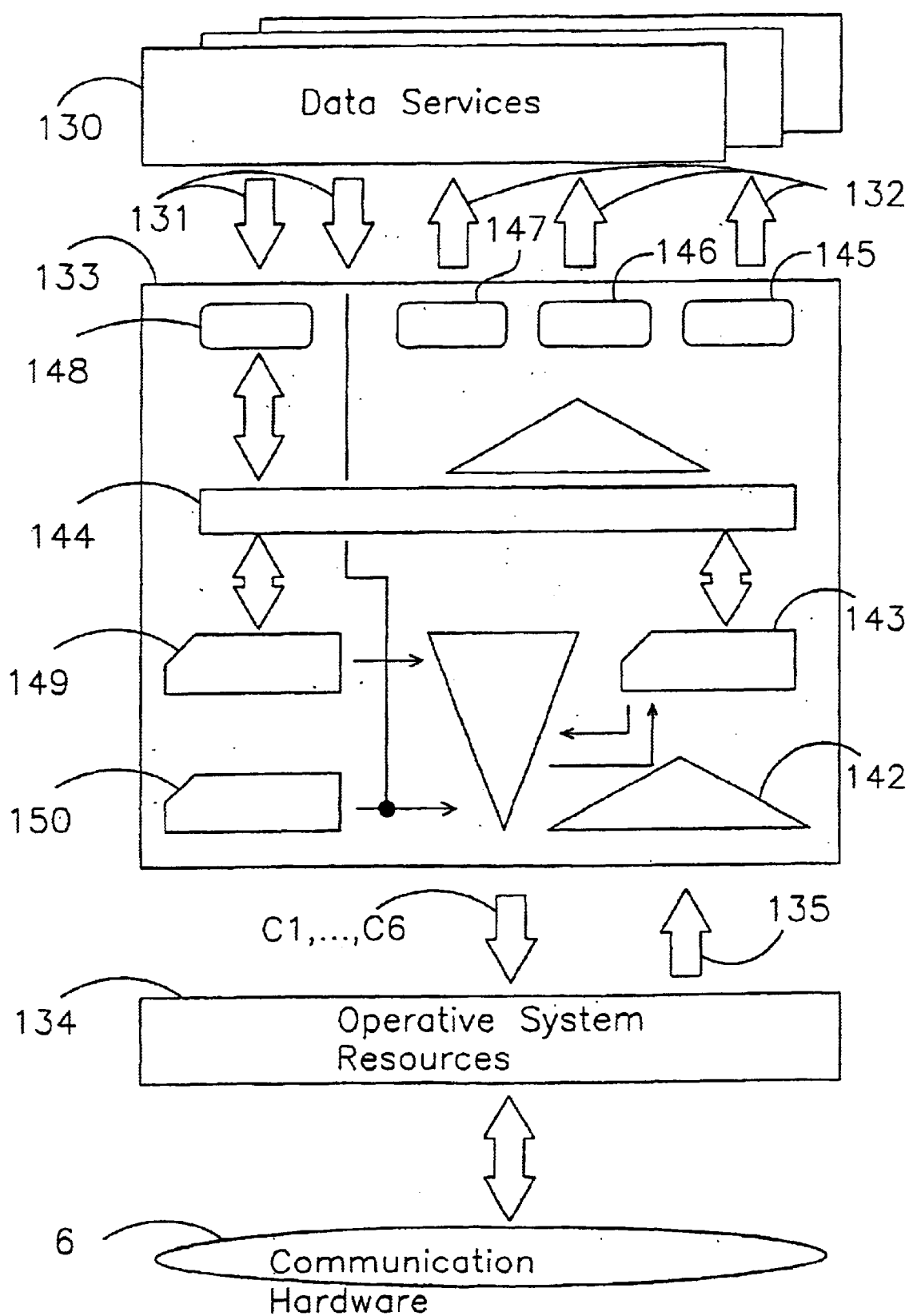
FIG. 6 shows a successive more detailed operating diagram of the management program of FIG. 4.

Now in reference to FIG. 6, an exploded view of the basic services of the block 133 can be noted.

As described previously the basic services of the block 133 are used to interface the high level software, that is the graphic interface 130 and the management of the databases, with the hardware resources of the centralised control system, that is personal computer 1, modem 22 and connection interfaces 2.

Block 133, therefore, permits data 135, coming from the sensors S1, . . . , S3 and/or interfaces 2 to be received and interpreted, by means of an input data module 142, which in combination with a management module 143 of the errors of the interfaces 2 and in combination with a communication protocol 144, provides for said block 133 sending the data 132 that can be interpreted by the graphic interface 130.

This data 132 is subdivided into status data 145, in the events codes 146 and errors codes 147 of the interfaces 2.

In addition block 133 permits the commands of the user 131 coming from the graphic interface 130 by means of user commands module 148 to be translated into commands that can be interpreted by the interfaces 2, thanks to the combination of the communication protocol 144, of a commands ordering module 149 and of a commands coding module 150 for said interfaces 2. Thanks to this by means of a commands sequence module 151 it is possible to supply said commands C1, . . . , C6 to the block 134 of the resources of the operative system and in conclusion by means of the communication hardware 6 to the inventive management system.

What is claimed is:

1. A centralised control system comprising a personal computer; at least one communication interface having a first memory suitable for memorising a plurality of commands and a second memory suitable for memorising the events; at least one electronic control unit having a microprocessor and a third memory suitable for memorising the firmware necessary for the operation of said microprocessor; said control unit being suitable for controlling a plurality of solenoid valves and a main valve; said personal computer being connected to said at least one electronic control unit by means of said at least one control interface through communication means; said personal computer being provided with a management program resident in said personal computer; characterised in that said management program provides a plurality of transmittable commands to said at least one connection interface, said transmittable commands comprising a first command containing instructions for loading the contents of said third memory (NVM) in said first memory, a second command containing instructions for reading the contents of said first memory and transmitting it to said personal computer, a third command containing instructions for writing directly in said first memory, a fourth command containing instructions for reading directly the data contained in said first memory, a fifth command containing instructions for reading the data contained in said second memory; a sixth command containing instructions for selecting between a first (local) and second (remote) operative mode.

2. A centralised control system in accordance with claim 1, characterised in that said first command contains further instructions suitable for writing in said first memory the contents of said third memory (NVM).

3. A centralised control system in accordance with claim 1, characterised in that said first command contains further instructions suitable for rereading the contents of said third memory (NVM).

4. A centralised control system in accordance with claim 1, characterised in that said first command contains further instructions suitable for turning off said plurality of solenoid valves suitable for being commanded by said at least one electronic control unit connected to a respective of said connection interfaces being managed by said management program.

5. A centralised control system in accordance with claim 1, characterised in that said third command contains instructions for selecting specific portions of said first memory in which to write the data.

6. A centralised control system in accordance with claim 1, characterised in that said fourth command contains instructions for selecting specific portions of said first memory in which to write the data.

7. A centralised control system in accordance with claim 1, characterised in that said fifth command contains instructions for selecting specific portions of said second memory in which to write the data.

* * * * *